United States Patent [19]

Reinauer

[11] Patent Number: 4,955,764

[45] Date of Patent: Sep. 11, 1990

[54] BORING TOOL COOLED FROM WITHIN MADE OF A TOOL SPIRAL AND A CLAMPING CYLINDER

[75] Inventor: Josef Reinauer, Sigmaringen, Fed. Rep. of Germany

[73] Assignee: Gottlieb Guhring KG, Ebingen, Fed. Rep. of Germany

[21] Appl. No.: 346,290

[22] Filed: May 1, 1989

Related U.S. Application Data

[63] Continuation of Ser. No. 167,147, Mar. 11, 1988, abandoned.

[30] Foreign Application Priority Data

Mar. 26, 1987 [DE] Fed. Rep. of Germany ... 8704477[U]

[51] Int. Cl.⁵ .............................................. B23B 27/10
[52] U.S. Cl. ........................................ 408/59; 279/48; 279/20; 408/57
[58] Field of Search .................. 408/57, 59, 56; 409/234; 279/42, 48, 20

[56] References Cited

U.S. PATENT DOCUMENTS

| | | |
|---|---|---|
| 4,231 | 10/1845 | Crane . |
| 1,314,690 | 9/1919 | Nagle . |
| 2,407,501 | 9/1946 | Kraus . |
| 2,687,826 | 5/1954 | Nick .................................... 279/48 |
| 2,852,969 | 9/1958 | Piha . |
| 2,865,572 | 12/1958 | Lannert . |
| 4,099,889 | 7/1978 | Vig . |
| 4,165,944 | 8/1979 | Sunasky . |
| 4,212,567 | 7/1980 | Wermeister . |
| 4,367,991 | 1/1983 | Grafe . |
| 4,461,602 | 7/1984 | Zettl . |
| 4,566,826 | 1/1986 | Dickinson . |
| 4,684,298 | 8/1987 | Roos . |
| 4,704,055 | 11/1987 | Gohring ............................... 408/59 |
| 4,705,439 | 11/1987 | Heyle et al. ......................... 408/56 |
| 4,768,901 | 9/1988 | Reinauer . |
| 4,784,535 | 11/1988 | Reinauer . |
| 4,813,831 | 3/1989 | Reinauer . |
| 4,844,671 | 7/1989 | Reinauer . |
| 4,856,944 | 8/1989 | Reinauer . |

FOREIGN PATENT DOCUMENTS

| | | |
|---|---|---|
| 492295 | 6/1930 | Fed. Rep. of Germany . |
| 1221526 | 2/1967 | Fed. Rep. of Germany . |
| 1602750 | 3/1975 | Fed. Rep. of Germany . |
| 129532 | 1/1978 | Fed. Rep. of Germany . |
| 129535 | 1/1978 | Fed. Rep. of Germany . |
| 3402547 | 8/1985 | Fed. Rep. of Germany . |
| 3590759 | 10/1986 | Fed. Rep. of Germany . |
| 1266970 | 6/1961 | France . |
| 8605729 | 10/1986 | World Int. Prop. O. . |

Primary Examiner—Bruce Y. Arnold
Assistant Examiner—J. Ryan
Attorney, Agent, or Firm—Oblon, Spivak, McClelland, Maier & Neustadt

[57] ABSTRACT

Described is a boring tool cooled from within made of a tool spiral and a clamping cylinder. The tool spiral is received in an interlocking way in a recess of the clamping cylinder and is supplied with coolant over its proximal end, which lies in the recess. The tool spiral (4; 44; 74) is received in a spring chuck (12) which, on the side facing away from the clamping cylinder, carries a drive disk (22; 62; 92) that engages in an interlocking way into the grooves. Further, the chuck body (14) has a central internal thread (26) in which an adjusting screw (24) having a central recess (32) is provided, an adjusting screw (24) against which the tool spiral under sealing of its coolant channels (8; 48; 78) can be pressed against the inner space (34) of the spring chuck (12). Tool spirals consisting, for example, of hard metal can be used more economically in this way.

15 Claims, 4 Drawing Sheets

BORING TOOL COOLED FROM WITHIN MADE OF A TOOL SPIRAL AND A CLAMPING CYLINDER

This is a continuation of Ser. No. 167,147 filed Nov. 11, 1988 now abandoned.

FIELD OF THE INVENTION

The invention relates to a boring tool cooled from within made of a tool spiral and a clamping cylinder in which the tool spiral is received interlockingly in a recess of the clamping cylinder and is supplied with coolant over the end that lies in the recess.

BACKGROUND OF THE INVENTION

Connection techniques have already been suggested to connect a tool spiral, for example consisting of hard metal, with as little expense as possible to a clamping cylinder so that an uninterrupted coolant supply is made possible to the inner coolant channels without stressing the connecting surfaces excessively. However, the previous solution suggestions had the drawback that, through them, an undetachable connection between the hard metal spiral and the clamping cylinder had to be made. Because of this, application possibilities of the tool were limited with increasing duration of use—i.e., after multiple grindings.

OBJECT OF THE INVENTION

The object of the invention is to provide a boring tool cooled from within of the type mentioned in which the tool spiral can be used economically.

SUMMARY OF THE INVENTION

According to the invention, the tool spiral is detachably attached to the clamping cylinder by use of a spring chuck. To improve the torque transmission, a drive disk matched to the profile shape of the tool spiral is used. In this way not only is a good drive in the direction of rotation assured, but beyond that the condition is provided for setting the projecting length of the tool spiral freely with regard to the bore hole depth. With an adjusting screw it can still be assured that a secure sealing of the cooling channel against the inner space of the spring chuck occurs. In this way, the space behind the adjusting screw is freely available for shaping into the coolant or lubricant inlet space. In this way also the boring tool is suited for all coolant supply systems in which the coolant is fed axially or radially to the shank.

When the jaws of the spring chuck in its clamped state follow the tapering of the tool spiral, there results a more uniform clamping over the entire length of the spring chuck. It has been shown that the radial elasticity of the spring chuck is large enough to insert the tool spiral from behind into the spring chuck for assembly and to adjust it by screwing it through the drive disk.

Basically, the production of a sealing contact connection between the adjusting screw and the tool spiral is possible because, either on the adjusting screw or on the adjacent front end of the tool spiral, an adaptor body is provided which makes available a purposeful flow medium connection between the coolant inlet space and the individual coolant channel of the spiral. However, it is especially advantageous for the tool spiral to have, on the side facing the adjusting screw, a soldered on support body, since in this way the sealing is independent of the relative position of the hard metal spiral and the adjusting screw.

The object of the boring tool according to the invention has considerable advantages especially when high grade materials (such as, for example, solid hard metal or high speed steel) are used for the tool spiral. The spiral can be resharpened considerably more often than is the case with single piece tools, so a more economical use of the material results. By changing the position of the adjusting screw, the clamping length of the spiral can be varied so that as little material as possible is lost.

DETAILED DESCRIPTION OF THE PRESENTLY PREFERRED EMBODIMENTS

Figure 1:
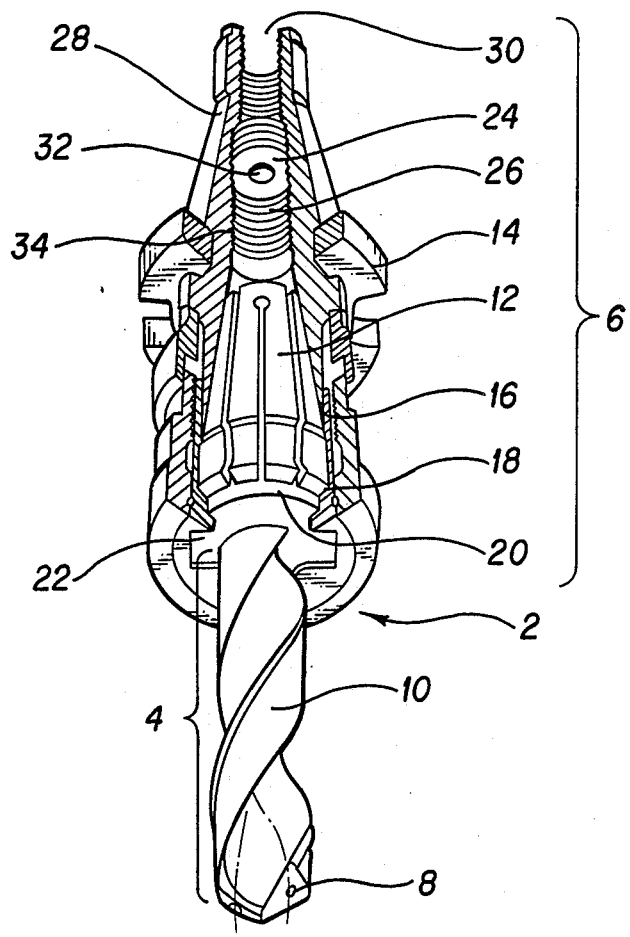
FIG. 1 is a perspective view in partial section of a boring tool cooled from within within a hard metal spiral.

In FIG. 1, reference numeral 2 designates a boring tool that consists of a hard metal spiral 4 and a clamping cylinder 6. The hard metal spiral 4 contains inner coolant channels 8 which run into boring tool crosspieces or webs 10.

The clamping cylinder 6 includes a spring chuck 12 which is matched to the outer contour of the hard metal spiral 4 (i.e., which, in the clamped state with the inner clamping surfaces, follows the taper of the hard metal spiral 4 with a conicity of, for example, 1:1000). The spring chuck 12 has a conical outer surface for interaction with an inner cone of a chuck body 14. A tightening nut 18 can be screwed into the chuck body 14 with a thrust ring 20 through a thread 16. The hard metal spiral 4 is thus received in a so-called double cone spring chuck, and the clamping occurs on the minor cutting edges of the hard metal spiral 4.

To transmit higher torsion moments, in the thrust ring 20 and through a claw connection a drive disk 22 is received the inner recess of which is matched to the cross section of the hard metal spiral 4. In the representation according to FIG. 1, the hard metal spiral 4 is not yet in the final position. When the tightening nut 18 is disengaged, it can be turned so far into the interior of the spring chuck 12 that it reaches adjacent contact with an adjusting and stop screw 24 the function of which will be described in more detail below.

The adjusting and stop screw 24 is received in an internal thread 26 in the chuck body 14, which in this region has a gripping taper sleeve 28. By the adjusting and stop screw 24, the internal thread 26 is divided into two spaces, one of which, a space 30, faces away from the hard metal spiral 4 and functions as a coolant and lubricant inlet space. For coolant supply to the hard metal spiral 4, the adjusting and stop screw 24 has a central throughhole 32 which, in a way to be described in more detail below, interacts with a support body yet to be described to make a flow medium connection to the coolant channels 8 that is sealed against the space 34.

Figure 2:
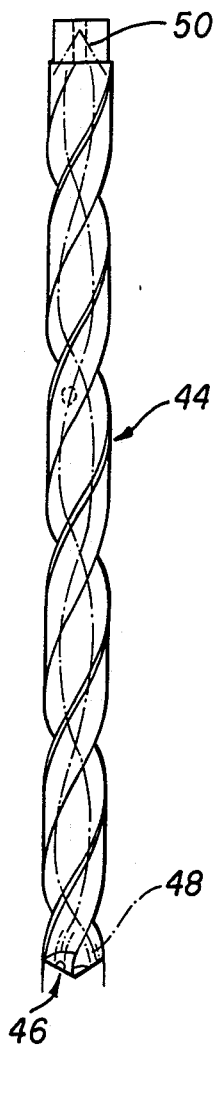
FIG. 2 is a side view of the hard metal spiral shown in FIG. 1.

In the following, FIGS. 2 and 4–6 (which show parts of the first embodiment of the boring tool) will be described in more detail. In FIG. 2, reference numeral 44 designates a two groove hard metal spiral on the tool cutting edge 46 of which coolant channels 48 emerge. On the side facing away from the tool cutting edge 46, the hard metal spiral 44 has a support body 50 that is shown in more detail in FIGS. 5 and 6 and that essentially has a shape of a cylinder with a central throughhole 52. On the side 54 facing the hard metal spiral 44, the support body 50 has a conical recess 56 so that a tapered sleeve shaped in a complimentary fashion on the side of the hard metal spiral 44 can engage in an interlocking way. On this side there is further a diametrically running groove 58 provided which is guided radially so far outward that it is in alignment with the mouth orifices of the coolant channels 48. The support body 50, in the position where the groove 58 is aligned with the mouth orifices of the coolant channels 48, is preferably soldered to the hard metal spiral 44. When the hard metal spiral 44 is thus pressed by the support body 50 by way of the sealing surface 60 against the adjusting and stop screw 24, the fluid can flow out of the space 30 unimpeded into the coolant channels 48 without the inside of the space 34 being acted upon by coolant. To improve the seal, either the adjusting and stop screw 24 can consist entirely of plastic or at least have a plastic coating on the side facing the support body 50.

Figure 4:
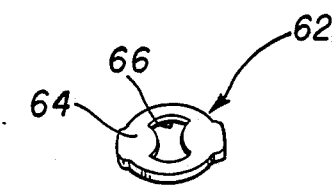
FIG. 4 is a perspective view of a drive disk for the hard metal spiral according to FIG. 2.
Figure 5:
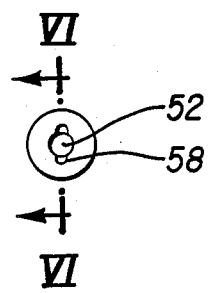
FIG. 5 is a top view of a support body for the hard metal spiral according to FIG. 2.
Figure 6:
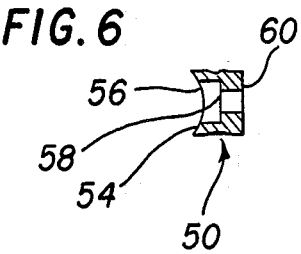
FIG. 6 is a sectional view along the line VI—VI in FIG. 5.

FIG. 4 shows a perspective view of a drive disk 62 which is designed for the two groove hard metal spiral 44 according to FIG. 2. Reference numeral 64 designates claws that engage in recesses of the thrust ring 20 of the spring chuck 12 described above. The reference numeral 66 designates a recess the contour of which follows the cross section of the hard metal spiral 44.

When assembling the boring tool, one proceeds as follows. First a suitable drive disk 22 or 62 is put into the adjusting nut 18. Then the spring chuck 12 is inserted. Next the hard metal spiral 44 is inserted or screwed in from behind into the spring chuck 12, and the drive disk 22 or 62. Next the position of the adjusting and stop screw 24 is set. Then the screwing of the entire mandrel on to the chuck body 14 can take place. By tightening the nut 18, the hard metal spiral 44 is fastened in the axial and peripheral directions, and simultaneously a sealing of the central throughhole 32 against the space 34 occurs.

Figure 3:
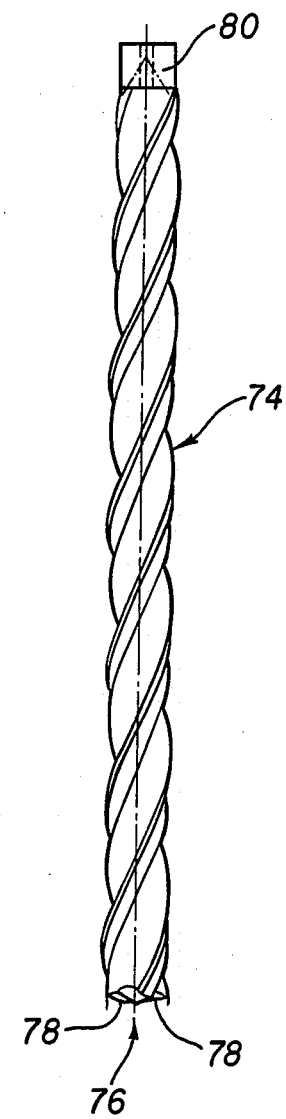
FIG. 3 is a side view of another hard metal spiral with a greater number of grooves.

FIG. 3 shows another hard metal spiral 74, which differs from the hard metal spiral 44 according to FIG. 2 in that it has one more spiral groove. On the side facing away from the tool cutting edge 76, a support body 80 is again provided, which is shown in detail in FIGS. 8 and 9. The support body 80 has a central bore hole 82 which widens on the side facing the hard metal spiral 74 and three equiangularly spaced grooves 88. The grooves 88 are radially so far outward that they are aligned with the mouth orifices of the coolant channel 78. In this embodiment, a conical recess 86 is also provided into which a cone section of hard metal spiral 74 engages tightly.

Figure 8:
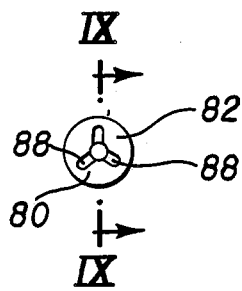
FIG. 8 is a top view of a support body for the hard metal spiral according to FIG. 3.
Figure 9:
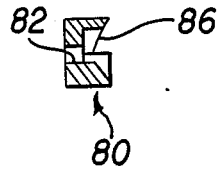
FIG. 9 is a sectional view along the line IX—IX in FIG. 8.

The embodiment according to FIGS. 3, 8, and 9 works in the same way as the embodiment described above, so it will not be described further.

Figure 7:
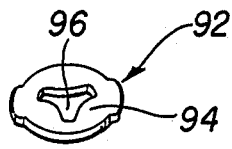
FIG. 7 is a perspective view of a drive disk for the hard metal spiral according to FIG. 3.

FIG. 7 shows a perspective view of a drive disk 92 that is equipped with claws 94 the shape of which is identical to the shape of the claw 64 according to FIG. 4. Differing from the drive disk according to FIG. 4, an inner recess 96 is shaped so that it adapts to the cross sectional contour of the three groove hard metal spiral 74. In this way, the drive disk 92 takes care not only of an inner locking drive, but also of a sealing of the inner side of the chuck.

Differing from the described embodiments, the tool spiral can also consist of high speed steel or of another material. The tool spiral can also be composed of several materials. For example, a hard metal spiral tip can be placed on a support spiral part. Further, the concept described is not limited to spirals with two or three cutting edges. Rather, spirals with multiple cutting edges can also be used without changing anything of the basic structure of the tool.

Obviously, numerous modifications and variations of the present invention are possible in light of the above teachings. It is therefore to be understood that, within the scope of the appended claims, the invention may be practiced otherwise than as specifically described herein.

Instead of the conical recess 56 or 86 of the support body, also a spherical recess could be used, especially in connection with a spherical section of the spiral 4 or 44.

Figure 10:
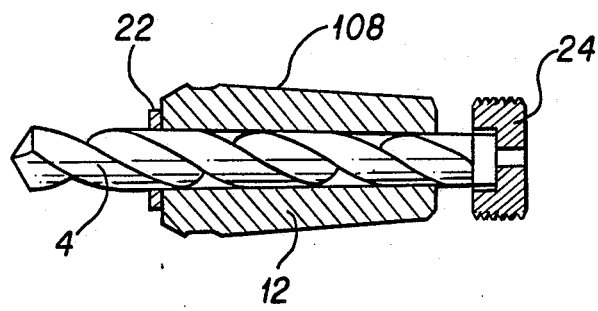
FIG. 10 shows the tool spiral, the spring chuck, and the adjusting and stop screw in the clamping position.
Figure 11:
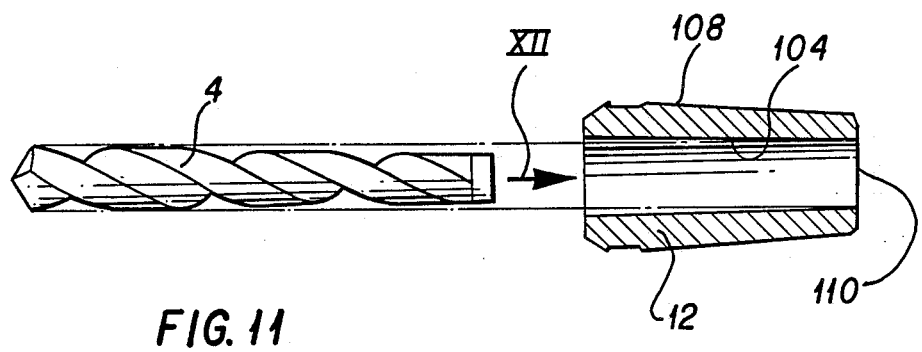
FIG. 11 shows the tool spiral and the spring chuck in the released condition.
Figure 12:
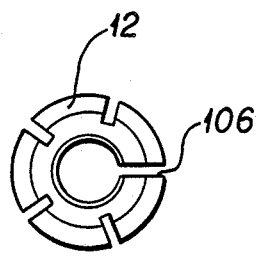
FIG. 12 is a plan view in the direction of the arrow XII in FIG. 11.

In order to better explain the clamping principle of the present invention, reference is made to FIGS. 10 to 12. FIG. 10 shows the tool spiral 4, the spring chuck 12, and the adjusting and stop screw 24 in the clamping position, whereas in FIG. 11 and 12 the spring chuck 12 is in the released condition. From these figures it is evident that the outer contour of the tool spiral 4 has a conical shape corresponding to the inner cone 104 of the spring chuck 12 in the clamped condition, where the slit 106 has been reduced in width. The outer cone 108 of the spring chuck meshes with the inner cone of the chuck body 14. In the released condition (FIG. 11,) the inner opening 110 of the spring chuck 12 is large enough to allow the tool spiral 4 to be inserted and screwed through the drive disk 22.

What is claimed as new and desired to be secured by Letters Patent of the United States is:

1. A boring tool comprising:
   (a) a tool spiral containing at least one inner coolant channel and
   (b) a clamping cylinder comprising a spring chuck and a chuck body,
   wherein:
   (c) said tool spiral is received in said spring chuck, which carries, on the side facing away from said clamping cylinder, a drive disk that engages interlockingly in clamping slots in said chuck body;
   (d) said chuck body has a central internal thread in which an adjusting screw provided with a central recess is threadably engaged;
   (e) said tool spiral can be pressed sealingly against said adjusting screw; and (f) said at least one inner coolant channel in said tool spiral is in fluid communication with said central recess in said adjusting screw when said tool spiral is pressed sealingly against said adjusting screw.

2. A boring tool according to claim 1 wherein the jaws of said spring chuck in its clamped state follow the tapering of said tool spiral.

3. A boring tool according to claim 1 wherein said tool spiral is sized, shaped, and positioned so that, when said spring chuck is tightened, said tool spiral is forced against said adjusting screw.

4. A boring tool according to claim 1 and further comprising an adjusting nut which acts upon a thrust ring in which said drive disk is received.

5. A boring tool according to claim 1 wherein said adjusting screw has a resilient plastic coating, thereby improving the seal between said adjusting screw and said tool spiral.

6. A boring tool according to claim 1 wherein said tool spiral is composed of solid hard metal or high speed steel.

7. A boring tool according to claim 1 wherein said tool spiral has multiple blades.

8. A boring tool comprising:
 (a) a tool spiral containing at least one inner coolant channel and
 (b) a clamping cylinder comprising a spring chuck and a chuck body,
 wherein:
 (c) said tool spiral is received in said spring chuck, which carries, on the side facing away from said clamping cylinder, a drive disk that engages interlockingly in clamping slots in said chuck body;
 (d) said chuck body has a central internal thread in which an adjusting screw provided with a central recess is threadably engaged;
 (e) said tool spiral can be pressed sealingly against said adjusting screw;
 (f) said at least one inner coolant channel in said tool spiral is in fluid communication with said central recess in said adjusting screw when said tool spiral is pressed sealingly against said adjusting screw; and
 (g) said tool spring has, on the side facing said adjusting screw, a support body which, on the side facing said tool spiral, has a connical recess for engagement with a correspondingly shaped end of said tool spiral and recesses that connect said at least one coolant channel with a central through hole in said drive disk.

9. A boring tool according to claim 8 wherein said support body is soldered on said tool spiral.

10. A boring tool according to claim 8 wherein the jaws of said spring chuck in its clamped state follow the tapering of said tool spiral.

11. A boring tool according to claim 8 wherein said tool spiral is sized, shaped, and positioned so that, when said spring chuck is tightened, said tool spiral is forced against said adjusting screw.

12. A boring tool according to claim 8 and further comprising an adjusting nut which acts upon a thrust ring in which said drive disk is received.

13. A boring tool according to claim 8 wherein said adjusting screw has a resilient plastic coating, thereby improving the seal between said adjusting screw and said tool spiral.

14. A boring tool according to claim 8 wherein said tool spiral is composed of solid hard metal or high speed steel.

15. A boring tool according to claim 8 wherein said tool spiral has multiple blades.

* * * * *